US009509708B2

(12) United States Patent
Kouznetsov

(10) Patent No.: US 9,509,708 B2
(45) Date of Patent: Nov. 29, 2016

(54) SECURITY INFORMATION AND EVENT MANAGEMENT

(71) Applicant: Wontok Inc., Palm Beach Gardens, FL (US)

(72) Inventor: Oleg Kouznetsov, Palm Beach Gardens, FL (US)

(73) Assignee: Wontok Inc., Palm Beach Gardens, FL (US)

(*) Notice: Subject to any disclaimer, the term of this patent is extended or adjusted under 35 U.S.C. 154(b) by 18 days.

(21) Appl. No.: 14/557,545

(22) Filed: Dec. 2, 2014

(65) Prior Publication Data

US 2016/0156642 A1    Jun. 2, 2016

(51) Int. Cl.
*H04L 29/06* (2006.01)
*G06F 17/30* (2006.01)
*G06F 21/55* (2013.01)
*G06F 21/56* (2013.01)

(52) U.S. Cl.
CPC ..... *H04L 63/1416* (2013.01); *G06F 17/30144* (2013.01); *G06F 21/552* (2013.01); *G06F 21/566* (2013.01); *H04L 63/145* (2013.01); *G06F 2221/2101* (2013.01)

(58) Field of Classification Search
CPC ............. H04L 63/1416; H04L 63/145; G06F 17/30144; G06F 21/552; G06F 21/566; G06F 2221/2101
See application file for complete search history.

(56) References Cited

U.S. PATENT DOCUMENTS

| 7,487,548 | B1* | 2/2009 | Conover | G06F 21/52 713/187 |
| 7,765,558 | B2* | 7/2010 | Kouznetsov | G06F 9/542 713/164 |
| 8,090,816 | B1* | 1/2012 | Deshmukh | G06F 21/554 709/223 |
| 8,176,527 | B1* | 5/2012 | Njemanze | G06F 21/554 709/223 |
| 8,225,404 | B2* | 7/2012 | Freericks | G06F 21/57 713/164 |
| 8,332,872 | B2* | 12/2012 | Kouznetsov | G06F 9/542 713/164 |
| 8,341,649 | B2* | 12/2012 | Freericks | G06F 9/542 719/318 |

(Continued)

OTHER PUBLICATIONS

Internation Searching Authority, Written Opinion of the Internation Searching Authority (PCT/US2015/062942), Jun. 9, 2016, Internation Searching Authority, pp. 1-5.*

(Continued)

*Primary Examiner* — Joseph P Hirl
*Assistant Examiner* — Stephen Gundry
(74) *Attorney, Agent, or Firm* — Fox Rothschild LLP; Robert J. Sacco; Carol E. Thorstad-Forsyth

(57) ABSTRACT

Systems and methods for universal interception of events. The methods involve: intercepting functions performed by an OS object manager which specify Physical Events ("PEs") occurring therein, each PE comprising a real-time event occurring in an OS in runtime; obtaining PE information indicating which PEs are specified by the intercepted functions being performed by the OS object manager; analyzing the PE information to identify Virtual Events ("VEs") which are associated with each PE, where each VE comprises an event occurring when one of a plurality of operations is performed by an OS subsystem which facilitates an occurrence of a respective PE; filtering VE information specifying the VEs identified as being associated with the PEs so as to generate filtered information specifying only select ones of the VEs; and placing the filtered information is a queue for subsequent processing to detect malware threats to a computing device.

20 Claims, 4 Drawing Sheets

(56) References Cited

U.S. PATENT DOCUMENTS

| | | | | |
|---|---|---|---|---|
| 8,918,865 B2* | 12/2014 | Freericks | | G06F 21/54 726/22 |
| 9,235,705 B2* | 1/2016 | Freericks | | G06F 21/54 |
| 2003/0154402 A1* | 8/2003 | Pandit | | G06F 21/552 726/23 |
| 2004/0153998 A1* | 8/2004 | McGuire | | G06F 9/542 717/128 |
| 2006/0015880 A1* | 1/2006 | Kouznetsov | | G06F 9/542 719/318 |
| 2008/0320552 A1* | 12/2008 | Kumar | | G06F 21/552 726/1 |
| 2009/0044266 A1* | 2/2009 | Sharp | | G06F 21/566 726/14 |
| 2009/0187763 A1* | 7/2009 | Freericks | | G06F 21/54 713/167 |
| 2009/0187991 A1* | 7/2009 | Freericks | | G06F 21/57 726/24 |
| 2009/0288167 A1* | 11/2009 | Freericks | | G06F 21/54 726/23 |
| 2010/0138843 A1* | 6/2010 | Freericks | | G06F 9/542 719/318 |
| 2010/0251368 A1* | 9/2010 | Kouznetsov | | G06F 9/542 726/22 |
| 2011/0209219 A1* | 8/2011 | Zeitlin | | G06F 21/554 726/23 |
| 2011/0209222 A1* | 8/2011 | Sharp | | G06F 21/566 726/26 |
| 2012/0079594 A1* | 3/2012 | Jeong | | G06F 21/57 726/23 |
| 2012/0255003 A1* | 10/2012 | Sallam | | G06F 21/554 726/23 |
| 2013/0247185 A1* | 9/2013 | Viscuso | | G06F 21/554 726/22 |
| 2013/0312099 A1* | 11/2013 | Edwards | | G06F 21/554 726/24 |
| 2014/0283050 A1* | 9/2014 | Striem Amit | | H04L 63/1416 726/23 |
| 2015/0040231 A1* | 2/2015 | Oliphant | | G06F 21/57 726/25 |
| 2015/0113644 A1* | 4/2015 | Klein | | G06F 9/545 726/23 |
| 2015/0324146 A1* | 11/2015 | Xiao | | G06F 21/53 711/112 |
| 2015/0365427 A1* | 12/2015 | Ben-Shalom | | G06F 21/56 726/23 |
| 2016/0019122 A1* | 1/2016 | Johnson, III | | G06F 11/1469 714/19 |

OTHER PUBLICATIONS

Internation Searching Authority, PCT Internation Search Report (PCT/US2015/062942), Jun. 9, 2016, Internation Searching Authority, pp. 1-4.*

International Search Report and Written Opinion dated Feb. 12, 2016 for PCT/US2015/062942.

* cited by examiner

SECURITY INFORMATION AND EVENT MANAGEMENT

BACKGROUND

Statement of the Technical Field

The inventive arrangements relate to Security Information and Event Management ("SIEM"). More particularly, the inventive arrangements concern implementing systems and methods for universal interception of events in a computing system using a novel Universal Interception Manager ("UIM").

Description of the Related Art

Various SIEM systems are employed for facilitating protection of computing devices from malware threats thereto. These SIEM systems comprise a plurality of SIEM sensors for detecting occurrences of events in network nodes. Data loggers are provided for logging information associated with each of the detected events occurring in the respective network node. A centralized data processor periodically accesses the data logs and retrieves the information therefrom. The retrieved information is aggregated from many sources such that operations of the whole system can be monitored. The sources include serves, databases, and applications. The information may then be subsequently processed to: identify common attributes of events; correlate the information based on the common attributes of the events; issue alarms based on the correlated information; and/or generate charts with event data such that patterns of activity within the system can be detected.

SUMMARY OF THE INVENTION

The invention concerns implementing systems and methods for universal interception of events in a computing system. The methods involve intercepting a plurality of functions being performed by an Operating System ("OS") object manager which specify physical events occurring therein. Each physical event comprises a real-time event occurring in an OS at any point in runtime. Physical event information is obtained that indicates which physical events are specified by the intercepted functions being performed by the OS object manager.

The physical event information is then analyzed to identify a plurality of virtual events which are associated with each physical event. Notably, in some scenarios, different portions of the physical event information are analyzed simultaneously, concurrently or asynchronously by at least two event handlers at any given time. Each virtual event comprises an event occurring when one of a plurality of operations is performed by an OS subsystem which facilitates an occurrence of a respective physical event.

Virtual event information is then filtered to generate filtered information specifying only select ones of the virtual events. The virtual event information specifies (1) the virtual events identified as being associated with the physical events, and/or (2) at least one attribute that characterizes a specific context of at least one operation requested by either a user-mode program or a kernel-mode program during runtime of the OS. In some scenarios, the virtual event information is filtered based on previously specified security relevance of physical event types or virtual event types.

The filtered information is then serialized such that the information identifies the virtual events in an order defined by times at which corresponding ones of the physical events occurred. The serialized filtered information is placed in a queue for subsequent processing to detect malware threats to a computing device. Sometime thereafter, the filtered information is dispatched to a data logger software program, a malware detection software program or an intrusion detection software program.

In some scenarios, the computing system may be part of a Security Information and Event Management ("SIEM") based network. As such, the methods may further involve: logging the filtered information in at least one log file; and providing a remote centralized data processor access to the log file. Operations are then performed by the remote centralized data processor for aggregating filtered information from a plurality of network nodes. The aggregated filtered information can be analyzed to detect said malware threats.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
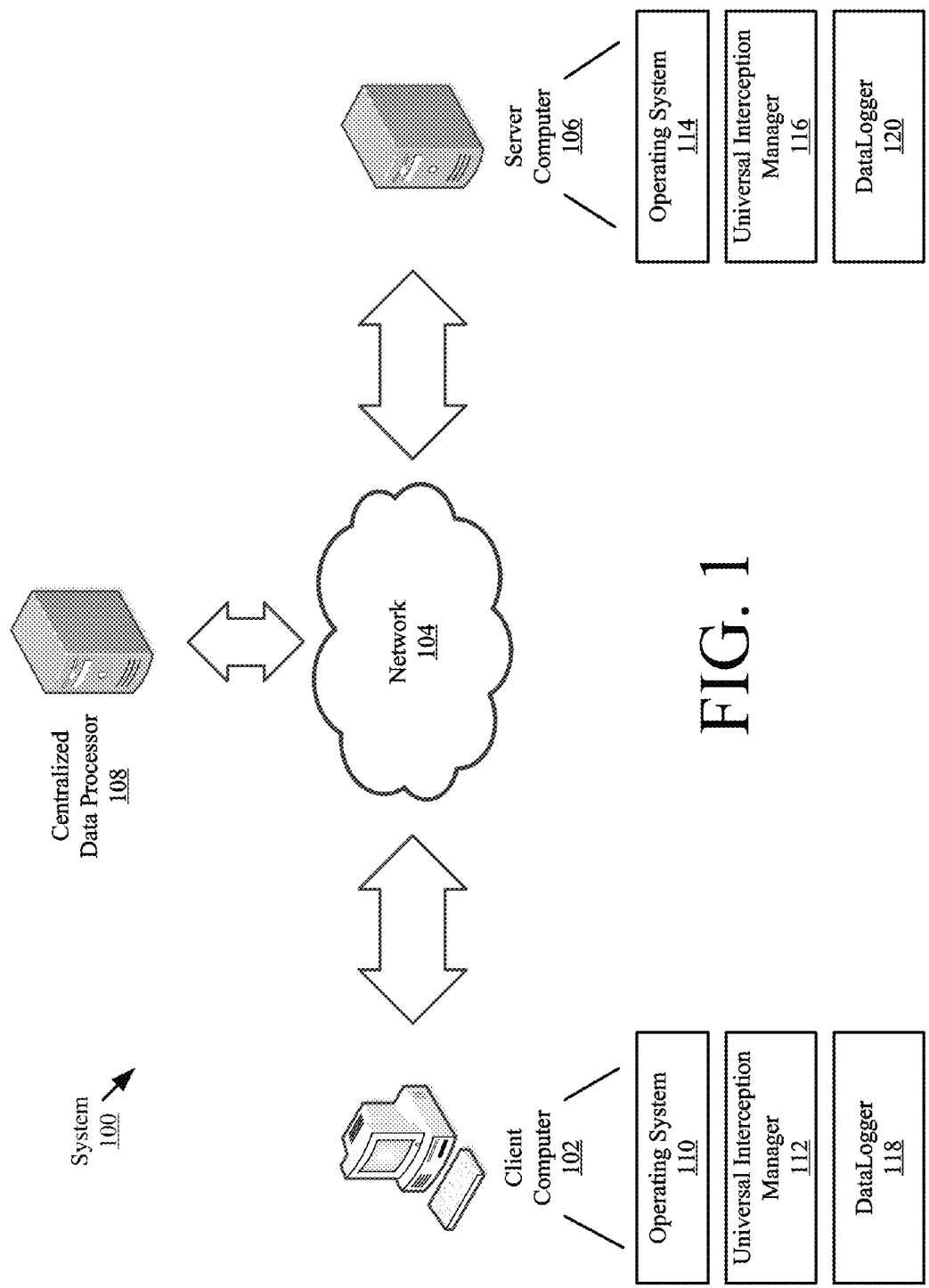
FIG. 1 is a schematic illustration of an exemplary architecture for a system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present invention generally concerns systems and methods for universal interception of events in a computing system using a novel Universal Interception Manager ("UIM"). The UIM is a system-level sensor cable of intercepting and handling virtually an unlimited number of asynchronous events with a very high degree of granularity while running concurrently with an Operating System ("OS") object manager and with minimal performance degradation impact. Operations of the UIM will become evident as the discussion progresses. Notably, the UIM can be implemented in hardware, software and/or both. Also, OS object managers (e.g., the Windows object manager) are well known in the art, and therefore will not be described herein.

Referring now to FIG. 1, there is provided a schematic illustration of an exemplary architecture for a system 100 that is useful for understanding the present invention. System 100 is generally configured to identify and respond to security threats thereto. Notably, the response time of system 100 is faster as compared to that of conventional SIEM based systems (such as that disclosed in the background section of this paper). In this regard, system 100 implements the novel UIM technology discussed herein for event detection within each network node.

As shown in FIG. 1, system 100 comprises a client computer 102, a server computer 106, and a Centralized Data Processor ("CDP") 108. Each of the computers 102, 106, 108 can operate as a single standalone device or can be connected (e.g., using the network 104) to other computing devices to perform various tasks in a distributed fashion. Each of the computers 102, 106, 108 can comprise various types of computing systems and devices, including a Personal Computer ("PC"), a tablet PC, a laptop computer, a desktop computer, or any other device capable of executing a set of instructions (sequential or otherwise) that specifies actions to be taken by that device. It is to be understood that a device of the present disclosure also includes any electronic device that provides voice, video or data communication. Further, while a single client computer 102 is illustrated in FIG. 1, the phrases "client computer" and "computer system" shall be understood to include any collection of computing devices that individually or jointly execute a set (or multiple sets) of instructions to perform any one or more of the methodologies herein.

The computers 102, 106, 108 are communicatively coupled to one another through respective connections to network 104. The network 104 includes an Internet, a Local Area Network ("LAN"), a Wide Area Network ("WAN") or any other suitable network for connecting computers. As such, data can be transferred between the computers 102, 106, 108.

In some scenarios, system 100 is a SIEM based system. As such, computers 102, 106, 108 implement SIEM technology. More specifically, computers 102, 106 implement the novel UIM technology of the present invention and data logging technology. The UIM technology is implemented via a UIM 112 or 116 software program. The data logging technology is implemented via a data logger 118 or 120 software program. Notably, the UIM technology can be used by any network node running an Operating System ("OS"). As such, system 100 may include any number of computers having UIM software installed thereon. Thus, the present invention is not limited to the particular system architecture shown in FIG. 1.

Each computer 102, 106 comprise a data logger 118, 120 for logging information regarding events occurring therein (referred to herein as "event-related data"). The events specify operations being performed by an object manager of the OS 110 or 114 (e.g., the Windows OS). Such information is acquired by the UIM 112 or 116 running on the computer 102, 106. These logs are then made accessible to the CDP 108.

CDPs are well known in the art, and therefore will not be described in detail herein. Still, it should be understood that the CDP 108 performs data aggregation operations, data correlation operations, alerting operations and/or dashboard operations. The data aggregation operations generally involve aggregating event-related data from many sources, such as from the client computer 102 and the server computer 106. The correlation operations involve identifying common attributes of a plurality of events and linking events into groups based on their common attributes. The alerting operations involve performing an automated analysis of correlated events and producing alerts specifying which events need to be investigated prior to other events. The dashboard operations comprise generating and presenting charts showing patterns in the event-related data.

Figure 2:
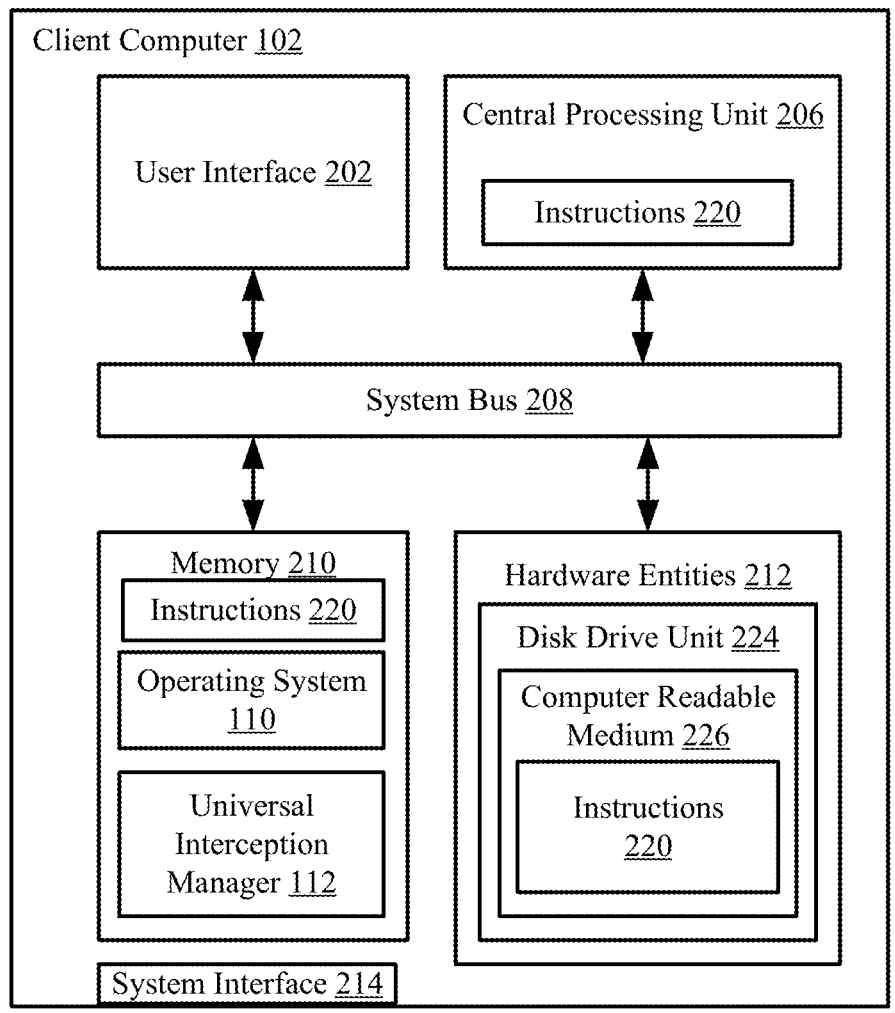
FIG. 2 is a schematic illustration of an exemplary architecture for the client computer shown in FIG. 1.

Referring now to FIG. 2, there is provided a schematic illustration of an exemplary architecture for the client computer 102 shown in FIG. 1. Server computer 106 is the same as or similar to client computer 102. Therefore, the following discussion of client computer 102 is sufficient for understanding server computer 106.

As shown in FIG. 1, client computer 102 comprises a system interface 214, a user interface 202, a Central Processing Unit ("CPU"), a system bus 208, a memory 210 connected to and accessible by other portions of client computer 102 through system bus 208, and hardware entities 212 connected to system bus 208. At least some of the hardware entities 212 perform actions involving access to and use of memory 210, which may be a Random Access Memory ("RAM"), a disk driver, and/or a compact disc Read Only Memory ("CD-ROM").

User interface 202 is comprised of input devices, output devices, and software routines configured to allow a user to interact with and control software applications installed on the client computer 102. Such input and output devices include, but are not limited to, a display screen (not shown), a speaker (not shown), a keypad (not shown), a directional pad (not shown), a directional knob (not shown), and a microphone (not shown). As such, user interface 202 can facilitate a user-software interaction for launching software applications (e.g., a web browser) installed on client computer 102.

System interface 214 allows the client computer 102 to communicate directly or indirectly with other remotely located computers (e.g., server 106 and/or CDP 108 of FIG. 1). If the client computer 102 is communicating indirectly with a remote computer, then the client computer 102 is sending and receiving communications through the common communications network (e.g., network 104 of FIG. 1).

Hardware entities 212 may include microprocessors, Application Specific Integrated Circuits ("ASICs"), and other hardware. Hardware entities may include a microprocessor programmed for providing SIEM related functionality, and more specifically UIM functionality. In this regard, it should be understood that the microprocessor can access and run a UIM 112 software program installed on the client computer 102. Alternatively, the microprocessor can have the UIM software program installed thereon. The UIM 112 will be described below in relation to FIG. 3.

As shown in FIG. 2, the hardware entities 212 can include a disk drive unit 224 comprising a computer-readable storage medium 226 on which is stored one or more sets of instructions 220 (e.g., software code) configured to implement one or more of the methodologies, procedures, or functions described herein. The instructions 220 can also reside, completely or at least partially, within the memory 210 and/or within the CPU 206 during execution thereof by the client computer 102. The memory 210 and the CPU 206 also can constitute machine-readable media.

While the computer-readable storage medium 226 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to, solid-state memories such as: a memory card or other package that houses one or more read-only (non-volatile) memories, RAMs, or other re-writable (volatile) memories; magneto-optical or optical medium such as a disk or tape; carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Figure 3:
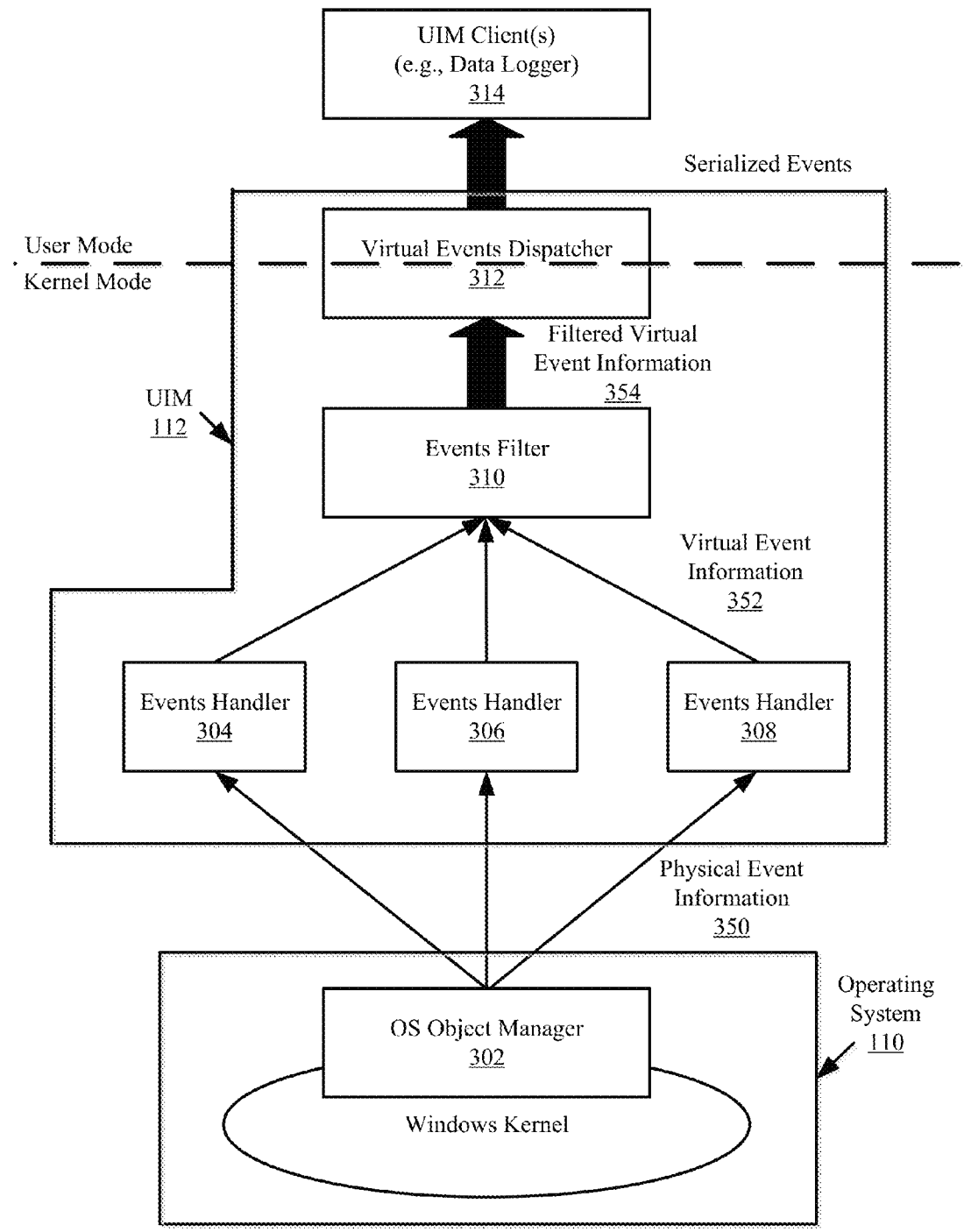
FIG. 3 is a schematic illustration that is useful for understanding operations of the universal interception manager shown in FIG. 1 and implemented by the client computer of FIGS. 1-2.

Referring now to FIG. 3, there is provided a schematic illustration that is useful for understanding operations of the UIM 112 shown in FIGS. 1-2. The UIM 116 of FIG. 1 is the same as or similar to UIM 112. As such, the following discussion of UIM 112 is sufficient for understanding UIM 116.

Generally, the UIM 112 is configured to detect operations being performed by an OS object manager 302 and provide information concerning the detected operations to a UIM client 314 (e.g., data logger 118 or 120 of FIG. 1, an intrusion prevention system, and/or an anti-rootkit prevention system). OS object managers are well known in the art, and therefore will not be described herein. Still it should be understood that the OS object manager 302 is a centralized resource broker of the OS 110, which keeps track of the resources allocated to processes.

In some scenarios, the OS object manager 302 comprises a Windows object manager. The Windows object manager is a subsystem implemented as part of a Windows Executive (i.e., low level kernel mode software program) which manages Windows resources. Each resource, which is surfaced as logical objects, resides in a namespace for categorization. Resources can include, but are not limited to, physical devices, files, folders, registry entries and running processes. All objects representing resources have an object type property and other metadata about the resource. The Windows object manager is a shared resource, and all subsystems that deal with the resources have to pass through the OS object manager. These subsystems include a cache manager, a configuration manager, an Input/Output ("I/O") manager, a local procedure call, a memory manager, and a process structure and security reference monitor. All of these listed subsystems and the OS object manager comprise the services of the Windows Executive.

The OS object manager 302 is implemented as a kernel-mode component of an underlying OS. The phrase "kernel-mode" a used herein refers to a state in which a process runs kernel code (e.g., device driver code, platform service code, and other kernel code that allows full access to the client computer 102). The OS object manager 302 provides different services implementing different types of filters. Notably, the core of the OS is based on an object-oriented model. Thus, the OS object manager 302 is a system-wide architectural convergence point in the OS intended for coherent and uniformed management of the resources that are being represented as objects. For example, in Windows OS applications, the OS object manager 302 manages the objects in the OS by: providing a common, uniform mechanism for managing and using system resources; providing a common, uniform mechanism for managing the creation and destruction of system objects; providing a common, uniform, extensible method-based model for building and using system objects; supporting handle-based access of system objects; performing memory management based on reference counting; keeping an object namespace database for tracking object information; keeping track of resources assigned to each process; providing a common, uniform and centralized security model; and tracking access rights for specific objects to provide security.

Various standard facilities of the OS create their own unique object types to represent their internal data and to provide sets of services associated with each individual object type. A unique object type describes the properties that are common for all instances of this class of objects system-wide. For example, an I/O facility of the Windows object manager creates a file object type, which includes all copies of open files or all copies of open I/O devices. In other words, the objects inside the OS are specific kernel-mode data structures requiring shared access by multiple applications, components, modules and system services of the OS. Virtually nothing meaningful or useful could happen inside the OS without the OS manager facility being involved.

For each type of object in the OS 110, there are OS services and data structures associated therewith. Such OS services and data structures are programmatically accessible via designated OS Application Programming Interface ("API") functions that are specific to each individual OS object manager facility. For example, in order to create a file, the OS 110 exports a system function (e.g., a CreateFile function) that is part of a particular OS facility (e.g., a Windows user-mode Win32 facility). The function invokes the appropriate OS service (e.g., Windows kernel-mode Executive facility) that creates and represents an open file. In Windows applications, the Executive facility (as an integral part of handling of the whole CreateFile request) internally invokes an appropriate Windows Object Manager's method that in its own turn creates system compound object of a specific file type.

The OS object manager 302 may also be considered as a special-purpose dispatcher implementing universal services and methods that in their own turn manage the lifetime of some shared resources of an abstract type. As mentioned above, the OS 110 is a logical point of convergence at which all OS services provide a consistent, unified and secure access to shared resources in the OS, which are being represented as objects. To access a specific instance of an object, a user-mode application, system service and/or kernel-mode driver invoke(s) the open operation during which access rights are checked and a special descriptor is being created. The phrase "user-mode" as used herein refers to a state in which a process runs application code (e.g., end-user application code) rather than kernel code (e.g., device driver code and platform service code).

A set of object types implemented by the OS object manager depends on the version of the OS employed by the client computer 102. The following list identifies some of the basic objects of the OS object manager 302 that can be available through the OS API: adaptor; callback; controller; debugobject; desktop; device; directory; driver; event; eventpair; file; iocompletion; job; key; keyedevent; mutant; port; process; profile; section; semaphore; symboliclink; thread; timer; token; type; waitableport; windowstation; and wmiguide. Each of these listed objects is well known in the art, and therefore will not be described herein.

Referring again to FIG. 3, the UIM 102 is communicatively integrated with the OS object manager 302 such that it can filter calls to the OS system services and dispatch the filtered call to a UIM client 314. In this regard, the UIM 102 comprises event handlers 304-308, an events filter 310, and a Virtual Events Dispatcher ("VED") 312. The event handlers 304-308 are generally configured to detect and intercept functions being performed by the OS object manager 302 which specify physical events occurring therein.

In some scenarios, the event handlers 304-308 implement a technique for detecting and intercepting events in a computing system which is described in U.S. Pat. No. 7,765,558 to Kouznetsov (the "'558 patent). The entire disclosure of the '558 patent is incorporated herein by reference.

The term "physical event" as used here refers to a real-time event occurring in the OS 110 at any particular point in runtime. For example, a physical event may include a call to an OS system service, creation or closure of an object, or a modification of an object's state. Physical events occur asynchronously, independently and regardless of the UIM's action or inaction.

The event handlers 304-308 are also configured to identify a plurality of virtual events which are associated with each physical event (stated differently, map each physical events to a plurality of virtual events); and communicate information 352 to the event filter 310 specifying the identified virtual events for each physical event and an order in which the virtual events should be placed during a subsequent serialization process. The term "virtual event" as used here refers to an event that occurs when one of a plurality of operations is performed by an OS subsystem which facilitates an occurrence of a respective physical event. Accordingly, a physical event could result in the identification and selection of a variety and plurality of virtual events based on the contents of pre-stored Look-Up Tables ("LUTs"). For example, a Windows® OS uses the same system service to create the following three different types of objects: files; named pipes; and mail slots. The physical essence of a newly created object is determined by the parameters of the call to this specific system service. From a logical stand point of view, the call to the system service could be composed of several different operations, each of which in its own turn can map to a corresponding one of a plurality of different virtual events.

Each virtual event can be associated with a set of attributes that characterize the specific context of the operation requested. This set of attributes is defined by each individual event handler 304-308 in accordance with its internal logic of handling and processing physical events. In this regard, each event handler 304-308 has access to a data structure containing the unique identifier of the virtual event and information specifying at least one attribute of the virtual event. The data structure can include, but is not limited to, a LUT. An attribute of a virtual event could include, but is not limited to, the back-trace function which is being represented as call-back status of various functions that were invoked by the OS 110 in order to handle the virtual event (as well as other arbitrary data associated with the virtual event in question, such as an identifier of a calling thread, process, etc. . . . ).

In some scenarios, the event handlers 304-308 are configured to process information 350 associated with respective ones of a plurality of physical events. Thus, the event handlers do not process the same physical event information. Accordingly, the event handlers process different physical event information simultaneously, concurrently, asynchronously at any time. This notion is very important because it allows minimization of unwanted system-wide performance degradation impact that could be induced by multiple UIM clients 314.

The specifics of each event handler 304-308 and the logic of the internal implementation depends on the particular type of physical event assigned to the event handler along with the context and objective of how such physical event could be used and for what purpose. The overall objectives for the event handlers 304-308 is to (a) perform a real-time conversion (or mapping) of each physical event into virtual events and (b) make virtual events available for further handling by multiple asynchronously and concurrently running UIM clients 314. Such real-time conversion (or mapping) implies getting the contextual information that is available only at the time of occurrence of each individual physical event while packaging information about it into an abstract and context-independent data stream. Such information can be made available to the event handlers 304-308 via LUTs.

Some types of event handlers can include, but are not limited to, Executive Event Handlers ("EEHs") and Object Event Handlers ("OEHs"). The EEHs handle information associated with high-level system services of the OS's kernel. In contrast, the OEHs handle information associated with private events generated by the OS object manager 302.

Virtual events are generated by the OEHs when the OS system services are being invoked that manage objects residing at the kernel level of the OS object manager 302

(e.g., the Windows Executive facility). The OEHs intercept physical events while offering the following functionality and features to multiple UIM clients 314: low level filtering of calls issued to the method of type objects (also referred to herein as "object type methods"); high level filtering of calls to the basic services provided by the OS object manager; and acquisition of context-dependent information associated with a given physical event. The object type methods are invoked asynchronously at various stages of the life-cycle of an object's instance. The stages include, but are not limited to: open (creating a descriptor of the object); close (closing a descriptor of the object); delete (deleting the object); query name (querying the name of the object in a secondary namespace); parse (lookup of the name of an object in a secondary namespace); and security (reading or modifying the security attributes and settings of the object. The basic services include, but are not limited to: open by name (opening of the object by its name); reference by name (searching of the object by its name); create object (creating an instance of the object that is accessible within the OS object manager); create object type (creating a new object of a specific type); find handle (searching previously opened descriptor of the object); and insert object (inserting the object of a certain type which makes the object accessible through its handle or name). The context-dependent information is acquired using the following services: caller ID (a unique identifier of the process and thread in context of which physical event did occur); name and address of the main module of the process in context of which physical event did occur; and stack-based back-tracing of the calls that were invoked during handling and processing of the physical event. In view of the forgoing, the OEHs act as providers of virtual events allowing tracking of each and every attempt to access, manipulate and work with objects known to the OS object manager.

Referring again to FIG. 3, the event handlers 304-206 communicate virtual event information 352 specifying the virtual events to the events filter 310. Notably, physical events occur in the OS 110 during run time in response to specific requests issued by either a user-mode program or a kernel-mode program. Such physical events must be handled with minimal delay in order to avoid clearly unwanted system-wide performance degradation impact. Certain types of physical events could be generated quite intensively, and therefore such physical events could cause the generation of overwhelmingly large amounts of virtual event data by the event handlers 304-308 that must be serialized within the UIM 112. Such serialization of the virtual event data is performed by the events filter 310. After said serialization, the events filter 310 dynamically filters the real-time virtual events such that virtual event information associated with select physical events is passed to the VED 312. In this regard, the virtual event information 352 is dynamically filtered by the events filter 310 based on previously specified security relevance of various virtual event types, previously specified security relevance of physical event types, and/or the type of physical events with which the UIM clients 314 are concerned. For example, certain UIM clients 314 are interested in filtering and monitoring only select physical events, where the context of which is related to the opening of events of a particular file group of files, a particular branch of the registry or group of such branches, a particular process or group of processes, a particular thread or group of threads, and so on.

Filtered virtual event information 354 is generated as a result of the dynamic filtering performed by the events filter 310. The filtered virtual event information 354 comprises information specifying the occurrence of events which have relevance to the protection of a computing system against malware threats. Such information 354 is then forwarded to the VED 312, where it is temporarily stored in a queue. The queue may include a circular buffer of a predefined length. The VED 312 dispatches the information 354 to the UIM client 314 (e.g., data logger 118 of FIG. 1) for further processing (e.g., data logging). The information 354 is output from the queue based on a First In First Out ("FIFO") methodology. Notably, functionality provided by the VED 312 is available for both kernel-mode and user-mode components.

Figure 4:
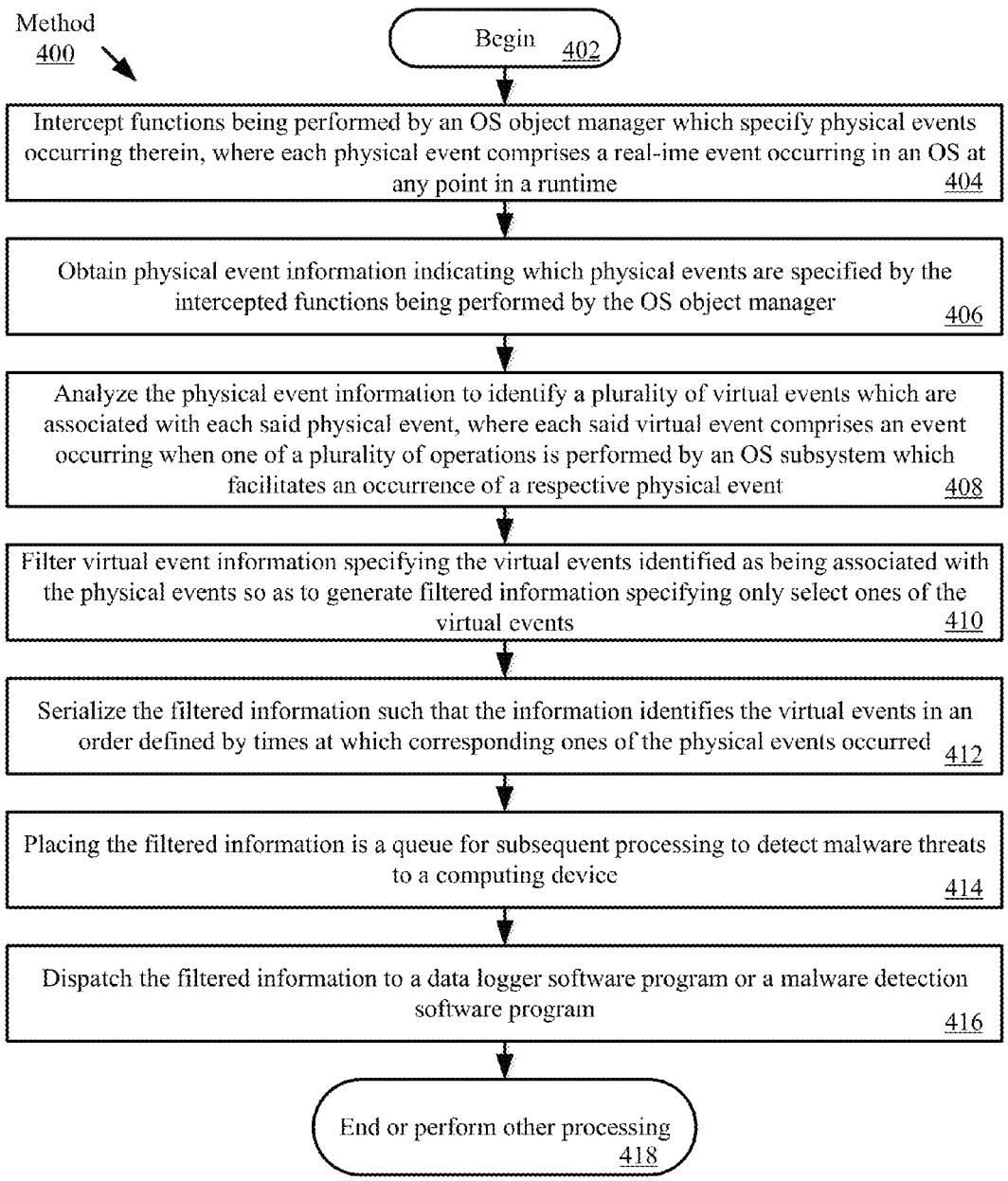
FIG. 4 is a flow diagram of an exemplary method for detecting events within a computing system.

FIG. 4 is a flow diagram of an exemplary method 400 for universal interception of events in a computing system (e.g., computer 102 or 106 of FIG. 1). The method 400 begins with step 402 and continues with step 404. Step 404 involves intercepting a plurality of functions being performed by an OS object manager (e.g., OS object manager 302 of FIG. 3) which specify physical events occurring therein. Each physical event comprises a real-time event occurring in an OS at any point in runtime. Physical event information is obtained in step 406 that indicates which physical events are specified by the intercepted functions being performed by the OS object manager.

The physical event information is then analyzed in step 408 to identify a plurality of virtual events which are associated with each physical event. Notably, in some scenarios, different portions of the physical event information are analyzed simultaneously, concurrently or asynchronously by at least two event handlers (e.g., event handlers 304-308 of FIG. 3) at any given time. Each virtual event comprises an event occurring when one of a plurality of operations is performed by an OS subsystem which facilitates an occurrence of a respective physical event.

Virtual event information is then filtered in step 410 to generate filtered information specifying only select ones of the virtual events. The virtual event information specifies (1) the virtual events identified as being associated with the physical events, and/or (2) at least one attribute that characterizes a specific context of at least one operation requested by either a user-mode program or a kernel-mode program during runtime of the OS. In some scenarios, the virtual event information is filtered based on previously specified security relevance of physical event types or virtual event types.

The filtered information is then serialized in step 412 such that the information identifies the virtual events in an order defined by times at which corresponding ones of the physical events occurred. The serialized filtered information is placed in a queue for subsequent processing to detect malware threats to a computing device, as shown by step 414. Sometime thereafter, step 416 is performed where the filtered information is dispatched to a data logger software program or a malware detection software program. Thereafter, step 418 is performed where method 400 ends or other processing is performed.

In some scenarios, the computing system may be part of a Security Information and Event Management ("SIEM") based network. As such, the methods may further involve: logging the filtered information in at least one log file; and providing a remote centralized data processor access to the log file. Operations are then performed by the remote centralized data processor for aggregating filtered information from a plurality of network nodes. The aggregated filtered information can be analyzed to detect said malware threats.

Notably, services and methods provided by the Windows Object Manager facility are not readily accessible for interception and monitoring to any standard filtering and event management mechanisms provided by Windows that other malware detection or SIEM sensor solutions (and similar) employ and rely upon. In other words (informally), "other" solutions are "blind'low-resolution" compared to the proposed method of high resolution SIEM sensor. Thus, such other conventional solutions do in fact miss a lot of security-sensitive and even security-critical events and activities in OS that happen in real-time. Consequently, these convention solutions by design are inadequate and destined to greatly degrade/hinder the quality of any subsequent security-related decision making process, such as detection of stealth malware and so on. For example, a lot of malware, attacks and anomalies go simply undetected, as a direct result of said blindness/low-resolution of the other malware detection or SIEM sensor solutions to begin with (one cannot fight threats that one cannot see and one by definition will never be able to see well-enough if by design one has low-resolution capabilities to begin with).

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for universal interception of events in a computing system, comprising:
   intercepting a plurality of functions being performed by an Operating System ("OS") object manager which specify physical events occurring therein, each said physical event comprising a real-time event occurring in an OS at any point in runtime, where said intercepting involves suspending said physical events in kernel mode and effecting an occurrence of each one of said physical events in user mode;
   obtaining physical event information indicating which physical events are specified by the intercepted functions being performed by the OS object manager;
   simultaneously performing operations by a plurality of event handlers to analyze respective portions of the physical event information to convert said physical events into a plurality of virtual events, where each said virtual event comprises an event occurring when one of a plurality of operations is performed by an OS subsystem which facilitates an occurrence of a respective physical event;
   serializing the plurality of virtual events;
   filtering virtual event information specifying the serialized virtual events so as to generate filtered information specifying only select ones of the serialized virtual events associated with ones of said physical events which have a subsequent impact on the computer system's security; and
   placing the filtered information in a queue for subsequent processing to detect malware threats to a computing device.

2. The method according to claim 1, wherein the virtual events are filtered based on previously specified security relevance of a physical event type or a virtual event type.

3. The method according to claim 1, further comprising serializing the filtered information such that the information identifies the virtual events in an order defined by times at which corresponding ones of the physical events occurred.

4. The method according to claim 1, further comprising dispatching the filtered information to a data logger software program, a malware detection software program or an intrusion detection software program.

5. The method according to claim 1, wherein the virtual event information specifies at least one attribute that characterizes a specific context of at least one operation requested by either a user-mode program or a kernel-mode program during runtime of the OS.

6. The method according to claim 1, wherein different portions of the physical event information are analyzed simultaneously, concurrently or asynchronously by at least two event handlers at any given time.

7. The method according to claim 1, wherein the computing system is part of a Security Information and Event Management ("SIEM") based network.

8. The method according to claim 7, further comprising:
   logging the filtered information in at least one log file; and
   providing a remote centralized data processor access to the log file.

9. The method according to claim 8, further comprising performing operations by the remote centralized data processor for aggregating filtered information from a plurality of network nodes.

10. The method according to claim 9, further comprising performing operations by the remote centralized data processor for analyzing the aggregated filtered information to detect said malware threats.

11. A system, comprising:
    an electronic circuit programed to:
       intercept a plurality of functions being performed by an Operating System ("OS") object manager which specify physical events occurring therein, each said physical event comprising a real-time event occurring in an OS at any point in runtime, where the plurality of functions are intercepted by suspending said physical events in kernel mode and effecting an occurrence of each one of said physical events in user mode;
       obtain physical event information indicating which physical events are specified by the intercepted functions being performed by the OS object manager;
       simultaneously perform operation by a plurality of event handlers to analyze respective portions of the physical event information to convert said physical events into a plurality of virtual events, each said virtual event comprising an event occurring when one of a plurality of operations is performed by an OS subsystem which facilitates an occurrence of a respective physical event;
       serialize the plurality of virtual events;
       filter virtual event information specifying the serialized virtual events so as to generate filtered information specifying only select ones of the serialized virtual events associated with ones of said physical events which have a subsequent impact on the system's security; and
       place the filtered information in a queue for subsequent processing to detect malware threats to a computing device.

12. The system according to claim 11, wherein the virtual events are filtered based on previously specified security relevance of a physical event type or a virtual event type.

13. The system according to claim 11, wherein the electronic circuit is further programed to serialize the filtered information such that the information identifies the virtual events in an order defined by times at which corresponding ones of the physical events occurred.

14. The system according to claim 11, wherein the electronic circuit is further programed to dispatch the filtered information to a data logger software program, a malware detection software program or an intrusion detection software program.

15. The system according to claim 11, wherein the virtual event information specifies at least one attribute that characterizes a specific context of at least one operation requested by either a user-mode program or a kernel-mode program during runtime of the OS.

16. The system according to claim 11, wherein different portions of the physical event information are analyzed simultaneously, concurrently or asynchronously by at least two event handlers at any given time.

17. The system according to claim 11, wherein system is part of a Security Information and Event Management ("SIEM") based network.

18. The system according to claim 17, wherein the electronic circuit is further programed to:
log the filtered information in at least one log file; and
provide a remote centralized data processor access to the log file.

19. The system according to claim 18, wherein the remote centralized data processor aggregates filtered information from a plurality of network nodes.

20. The system according to claim 19, wherein the remote centralized data processor analyzes the aggregated filtered information to detect said malware threats.

* * * * *